US006855075B2

(12) United States Patent
Ichikawa et al.

(10) Patent No.: US 6,855,075 B2
(45) Date of Patent: Feb. 15, 2005

(54) GOLF BALL COVER COMPOSITION AND GOLF BALL

(75) Inventors: Yasushi Ichikawa, Chichibu (JP); Toshimi Yamanaka, Tokyo (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 13 days.

(21) Appl. No.: 10/136,352

(22) Filed: May 2, 2002

(65) Prior Publication Data

US 2003/0073517 A1 Apr. 17, 2003

(30) Foreign Application Priority Data

May 8, 2001 (JP) ........................................ 2001-137221

(51) Int. Cl.$^7$ ............................................. A63B 37/14
(52) U.S. Cl. ...................................................... 473/378
(58) Field of Search ................................ 473/378, 377, 473/351

(56) References Cited

U.S. PATENT DOCUMENTS

| 4,616,064 | A | * | 10/1986 | Zukosky et al. ........... 525/92 B |
| 4,674,751 | A | * | 6/1987 | Molitor et al. .............. 473/385 |
| 4,884,814 | A | | 12/1989 | Sullivan |
| 5,816,937 | A | * | 10/1998 | Shimosaka et al. ......... 473/354 |
| 5,830,085 | A | * | 11/1998 | Higuchi et al. ............. 473/373 |
| 6,355,715 | B1 | * | 3/2002 | Ladd et al. ................. 524/432 |
| 6,390,936 | B1 | * | 5/2002 | Sugimoto ................... 473/374 |

* cited by examiner

*Primary Examiner*—Raeann Gorden
(74) *Attorney, Agent, or Firm*—Sughrue Mion, PLLC

(57) ABSTRACT

A composition comprising an ionomer resin, a thermoplastic urethane material, and a rubbery elastomer-containing rubbery elastomer composition and having a Shore D hardness of 45 to 63 when molded, is easy to mold and can provide a golf ball cover endowed with excellent resilience, durability and feel upon impact. Golf balls having a cover made of such a composition exhibit excellent rebound characteristics, durability and feel, and are able to achieve a greater distance.

3 Claims, No Drawings

GOLF BALL COVER COMPOSITION AND GOLF BALL

BACKGROUND OF THE INVENTION

1. Field of the Invention

The present invention relates to golf ball cover compositions which have a good moldability and are capable of providing golf ball covers of excellent resilience, durability and feel upon impact. The invention also relates to golf balls which have a cover made of such a composition and are thereby endowed with excellent rebound characteristics, durability and feel upon impact, as well as improved distance.

2. Prior Art

Ionomer resins are widely used today as a cover material in golf balls. These resins are typically made of an ionic copolymer of an olefin such as ethylene with an unsaturated carboxylic acid (e.g., acrylic acid, methacrylic acid, maleic acid), in which a certain proportion of the acidic groups have been neutralized with metal ions such as sodium or zinc. Such resins have outstanding characteristics such as durability and resilience which make them highly desirable as the base resin in golf ball cover stock.

Using a relatively hard ionomer resin as the golf ball cover stock serves to reduce friction between the club face and the ball during a driver shot, thus holding down backspin when the shot is taken. As a result, the ball is less affected by the wind when aloft and rolls well after landing, making it possible to achieve a good overall distance.

However, such ionomers have one significant drawback when used as the cover material in golf balls: they give the ball a very hard feel at the moment of impact.

To overcome this problem, U.S. Pat. No. 4,884,814 and JP-A 1-308577 disclose the use of a golf ball cover made of a blend of soft and hard ionomer resins, and specifically one arrived at by blending a given amount of a relatively soft ethylene/(meth)acrylic acid/(meth)acrylate terpolymer ionomer resin with an ethylene/(meth)acrylate copolymer ionomer resin of a hardness within a certain range.

This prior art has indeed provided a very effective way to significantly improve the hard feel of golf balls having a cover made of an ethylene/(meth)acrylic acid copolymer type ionomer resin.

However, golf ball covers made of a soft and hard ionomer resin blend as taught by the foregoing art have a number of drawbacks. To begin with, the relatively soft ethylene/(meth)acrylic acid/(meth)acrylate terpolymer type ionomer resin has a low resilience and a low mechanical strength, which lowers the rebound characteristics, total distance traveled and durability of golf balls made therewith. Moreover, ethylene/(meth)acrylic acid/(meth)acrylate terpolymer type ionomer resins have a high viscosity, which undesirably increases the viscosity of the resin blend, detracts from its moldability, and tends to result in a ball having a poor sphericity.

U.S. Pat. No. 4,674,751 describes a golf ball in which the cover is made of a resin having a specific hardness and prepared by melt blending under the application of heat an ionomer resin of a specific hardness with a thermoplastic urethane resin of a specific hardness. Unfortunately, because the ionomer resin and the thermoplastic urethane resin have a poor compatibility, the cover material thus disclosed has a poor moldability and molded covers made therewith have a poor durability to repeated impact.

SUMMARY OF THE INVENTION

It is therefore one object of the invention to provide golf ball cover compositions which have a good moldability and are capable of providing golf ball covers of excellent resilience, durability and feel upon impact. Another object is to provide golf balls which have a cover made of such a composition and are endowed with excellent rebound characteristics, durability and feel upon impact, as well as improved distance.

We have discovered that golf ball cover compositions which are composed of an ionomer resin, a thermoplastic urethane material and a rubbery elastomer-containing rubbery elastomer composition, and which, when molded, have a Shore D hardness of 45 to 63, exhibit a good synergy of effects from optimization of the materials and the hardness. That is, such compositions have a good moldability and are able to provide a golf ball cover endowed with good resilience, durability and feel upon impact. We have also found that golf balls in which the cover is formed of such a composition have excellent rebound characteristics, durability and feel upon impact, and are able to achieve a greater distance.

Accordingly, the invention provides a golf ball cover composition which includes (A) an ionomer resin, (B) a thermoplastic urethane material, and (C) a rubbery elastomer composition containing (a) a rubbery elastomer. The golf ball cover composition, when molded, has a Shore D hardness of 45 to 63.

The rubbery elastomer composition (C) typically includes also at least one substance selected from among (b) polar group-bearing compounds, (c) peroxide-decomposable olefinic resins or copolymer rubbers containing the same or both, (d) organic peroxides, and (e) rubber softeners. Preferably, the rubbery elastomer (a) has at least one polar group selected from among ester, carboxyl, carbonyl, acid anhydride, amino, hydroxyl, glycidyl and oxazolyl groups. It is likewise preferable for the polar group-bearing compounds (b) to have at least one polar group selected from among ester, carboxyl, carbonyl, acid anhydride, amino, hydroxyl, glycidyl and oxazolyl groups. The golf ball cover composition of the invention typically includes 100 parts by weight of the ionomer resin (A) and the thermoplastic urethane material (B) combined, and 1 to 50 parts by weight of the rubbery elastomer composition (C). In the inventive golf ball cover composition, the ionomer resin (A) and the thermoplastic urethane material (B) are typically compounded in a weight ratio of from 99:1 to 1:99.

The invention also provides a golf ball having a cover made of the above-described golf ball cover composition.

DETAILED DESCRIPTION OF THE INVENTION

One of the essential components of the inventive golf ball cover composition is an ionomer resin (A).

The ionomer resin A may be prepared by neutralizing an olefin/unsaturated carboxylic acid copolymer and an olefin/unsaturated carboxylic acid/unsaturated carboxylate terpolymer with metal ions. Use can generally be made of what are respectively known as a high rigidity type ionomer resin such as an olefin/unsaturated carboxylic acid copolymer, and a flexible type ionomer resin such as an olefin/unsaturated carboxylic acid/unsaturated carboxylate terpolymer.

The olefin in the above ionomer resins is preferably a hydrocarbon having 2 to 8 carbons, illustrative examples of which include ethylene, propylene, butene, pentene, hexene, heptene and octene. Ethylene is especially preferred.

The unsaturated carboxylic acid is preferably one having 3 to 8 carbons, illustrative examples of which include acrylic acid, methacrylic acid, maleic acid, and fumaric acid. Acrylic acid and methacrylic acid are especially preferred.

It is recommended that the high-rigidity type ionomer resin have an olefin/unsaturated carboxylic acid copolymer content (acid content) of generally at least 10 wt % and generally not more than 25 wt %, preferably not more than 20 wt %, more preferably not more than 18 wt %, and most preferably not more than 15 wt %. Too low an acid content may lower the rigidity of the molded cover and result in a poor resilience. On the other hand, too high an acid content may excessively raise the rigidity of the molded cover and result in a poor feel when the golf ball is struck with a club.

In the soft type ionomer resin, it is generally preferable for the carboxylic acid content within the olefin/unsaturated carboxylic acid/unsaturated carboxylate terpolymer to be at least 5 wt %, but not more than 15 wt %.

Examples of suitable unsaturated carboxylates include esters prepared by reacting the above unsaturated carboxylic acids with a lower alcohol such as methanol, ethanol, propanol, n-butanol or isopropanol. Generally, the carboxylate (ester) content within the terpolymer is at least 3 wt % but not more than 40 wt %.

The carboxyl groups in the unsaturated carboxylic acid within the ionomer resin serving as component A of the inventive golf ball cover composition are neutralized with metal ions. It is recommended that the degree of neutralization be at least 20 mol % and preferably at least 25 mol %, but not more than 80 mol % and preferably not more than 70 mol %. Too low a degree of neutralization may give the molded cover insufficient rigidity, thereby lowering the resilience. On the other hand, too high a degree of neutralization may fail to yield an observable improvement in the performance of the composition, and may lead to a decline in resin flow and processability.

Examples of metal ions that may be used for neutralization include $Li^+$, $Na^+$, $K^+$, $Zn^{2+}$, $Co^{2+}$, $Ni^{2+}$, $Cu^{2+}$, $Pb^{2+}$ and $Mg^{2+}$. Of these, $Li^+$, $Na^+$, $Zn^{2+}$ and $Mg^{2+}$ are especially preferred. The metal ions may be inserted from a compound containing the ions, such as a formate, acetate, nitrate, carbonate, bicarbonate, oxide, hydroxide or alkoxide thereof.

Any commercial ionomer resin commonly used in golf ball cover compositions may be used as the ionomer resin in the present invention. Illustrative examples include Himilan AM7315, Himilan AM7317, Himilan AM7318, Himilan 1706, Himilan 1605, Himilan 1601 and Himilan 1557 (all products of DuPont-Mitsui Polychemicals Co., Ltd.), as well as Surlyn 8120 and Surlyn 6320 (both products of E.I. du Pont de Nemours and Co., Inc.).

The ionomer resin serving as component A in the inventive composition may be any one or blend of two or more of the above-described ionomer resins. In the practice of the invention, it is especially desirable to use a blend of at least two ionomer resins of differing hardness or composition from among those described above. The ionomer resin included as component A in the inventive composition has a Shore D hardness of preferably at least 40, more preferably at least 42, even more preferably at least 56, and most preferably at least 60, and has an upper limit of 75, more preferably 65, and most preferably 63. Too low a Shore D hardness may give the molded composition insufficient resilience, whereas to high a Shore D hardness may give the molded composition too hard a feel upon impact and a poor durability to repeated impact.

The urethane material (B) serving as another essential component of the inventive composition may be, for example, a thermoplastic polyurethane elastomer or a urethane resin. Such urethane materials can be prepared by a known method from soft segments made of polymeric polyols having the molecular structures described below, monomolecular chain extenders which make up the hard segments, and aromatic, aliphatic or alicyclic diisocyanates.

No particular limitation is imposed on the polymeric polyols. Examples include polyester polyols, polyether polyols, copolyester polyols and polycarbonate polyols, any of which may be used with good results.

Illustrative examples of polyester polyols include polycaprolactone glycol, poly(ethylene-1,4-adipate) glycol and poly(butylene-1,4-adipate) glycol.

One example of a suitable copolyester polyol is poly(diethylene glycol adipate) glycol.

One example of a suitable polycarbonate polyol is (hexanediol-1,6-carbonate) glycol.

One example of a suitable polyether polyol is polyoxytetramethylene glycol.

It is recommended that these polymeric polyols have a number-average molecular weight of at least about 600 and preferably at least 1,000, but not more than 5,000 and preferably not more than 3,000.

Exemplary diisocyanates include aromatic, aliphatic and alicyclic diisocyanates, any of which may be used with good results.

Specific examples of suitable diisocyanates include tolylene diisocyanate (TDI), diphenylmethane diisocyanate (MDI), tolidine diisocyanate (TODI), naphthalene diisocyanate (NDI), hexamethylene diisocyanate (HDI), 2,2,4-(2,4,4)-trimethylhexamethylene diisocyanate (TMDI), lysine diisocyanate (LDI) and dicyclohexylmethane-4,4'-diisocyanate (hydrogenated MDI). Hexamethylene diisocyanate (HDI) and dicyclohexylmethane-4,4'-diisocyanate (hydrogenated MDI) are especially preferred for preventing discoloration.

The monomolecular chain extender is not subject to any particular limitation, and may be, for instance, any ordinary polyol or amine. Specific examples include 1,4-butylene glycol, 1,2-ethylene glycol, 1,3-propylene glycol, 1,6-hexylene glycol, 1,3-butylene glycol, dicyclohexylmethanediamine (hydrogenated MDA) and isophoronediamine (IPDA).

The urethane material serving as component B in the invention can be prepared by a known method from the above constituents.

It is desirable for the urethane material (B) to have a high impact resilience, as measured according to JIS-K7311. A value of at least 40%, and preferably at least 50%, is recommended. A urethane material having too low an impact resilience may fail to confer the overall golf ball cover composition with sufficient resilience.

The urethane material (B) generally has a Shore D hardness of at least 20, preferably at least 30, and most preferably at least 35, but not more than 70, preferably not more than 60, and most preferably not more than 55. Too high a Shore D hardness makes it difficult to impart sufficient flexibility to the molded cover, whereas too low a hardness may undesirably lower the durability of the cover.

The polyurethane material (B) used in the inventive golf ball cover composition may be a commercial product. Illustrative examples include Pandex T8190, T-R3080, T-7298 and T-7890 (all manufactured by DIC Bayer Polymer, Ltd.), and Texin DP 7-3005 (made by Bayer AG).

Another essential component of the inventive golf ball cover composition is a rubbery elastomer composition (C), which is blended together with the above-described ionomer resin (A) and urethane material (B). The rubbery elastomer composition (C) includes as an essential constituent a rubbery elastomer (a), which is used alone or in combination with one or more optional substance selected from among the following:

(b) polar group-bearing compounds;
(c) peroxide-decomposable olefinic resins and/or copolymer rubbers containing the same;
(d) organic peroxides; and
(e) rubber softeners.

The purpose of the rubbery elastomer composition (C) is to enhance the compatibility between the ionomer resin (A) and the urethane resin (B). In the absence of this component C, the components within the golf ball cover composition have a poor compatibility, resulting in delamination of the molded cover.

The essential constituent (a) and the above optional constituents (b) to (e) which make up the rubbery elastomer composition (C) in the inventive golf ball cover composition are each described below.

Rubbery Elastomer (a):

The inventive golf ball cover composition must include a rubbery elastomer (a) which is capable of compatibilizing the above-described ionomer resin (A) and urethane material (B).

Exemplary rubbery elastomers for use as constituent (a) in the invention include natural rubbers (NR), diene synthetic rubbers, and non-diene synthetic rubbers. Specific examples include such natural rubbers and diene synthetic rubbers as polyisoprene rubber (IR), polybutadiene rubber (BR), acrylonitrile-butadiene rubber (NBR), chloroprene rubber (CR), styrene-butadiene rubber (SBR), styrene-butadiene-styrene copolymer (SBS), hydrogenated styrene-butadiene rubber (H-SBR), styrene-ethylene-butene-styrene copolymer (SEBS), hydrogenated styrene-isoprene-styrene copolymer (SEPS), styrene-isoprene-butadiene-styrene copolymer (SIBS), hydrogenated styrene-isoprene-butadiene-styrene copolymer (SEEPS), styrene-isoprene-styrene copolymer (SIS) and acrylonitrile-butadiene-styrene copolymer (ABS). Specific examples of non-diene synthetic rubbers include ethylene-propylene copolymer rubber (EPR), ethylene-butene copolymer rubber (EBR), ethylene-propylene conjugated diene copolymer rubber (EPDM), ethylene-α-olefin copolymers synthesized using metallocene catalysts, acrylic rubbers (ACM, ANM), fluororubbers, polyester (co) polymers (elastomers), and polyamide polyester (co) polymers (elastomers).

Preferable use can be made of any of the following constituents as the rubbery elastomer (a):

(a-1) a block copolymer composed of at least one polymer block prepared primarily from an aromatic vinyl compound and at least one polymer block prepared primarily from a conjugated diene compound, and/or a hydrogenated product of the block copolymer;

(a-2) an ethylene copolymer (rubber) and/or an ethylene-α-olefin copolymer (rubber);

(a-3) a random copolymer composed primarily of an aromatic vinyl compound and a conjugated diene compound, and/or a hydrogenated product of the random copolymer.

Components (a-1) to (a-3) are each described below.

Component (a-1):

Preferred examples are block copolymers and/or hydrogenated block copolymers composed of at least one polymer block, referred to hereinafter as "block A," which is prepared primarily from an aromatic vinyl compound and at least one polymer block, referred to hereinafter as "block B," which is prepared primarily from a conjugated diene compound. Aromatic vinyl compound/conjugated diene compound block copolymers having any of various block arrangements, such as A-B, A-B-A, B-A-B-A or A-B-A-B-A, or hydrogenated products of these block copolymers, may be used as component (a-1).

It is recommended that component (a-1) include the aromatic vinyl compound in an amount of at least 5 wt %, and preferably at least 20 wt %, but not more than 60 wt %, and preferably not more than 50 wt %.

The polymer block A prepared primarily from an aromatic vinyl compound in component (a-1) may be composed entirely of the aromatic vinyl compound. Alternatively, it may be a copolymer block composed of at least 50 wt %, and preferably at least 70 wt %, of the aromatic vinyl compound, and containing also as a major component a (hydrogenated) conjugated diene compound (here and below, "(hydrogenated) conjugated diene compound" refers to a conjugated diene compound and/or a hydrogenated conjugated diene compound).

Polymer block B, which is prepared primarily from a (hydrogenated) conjugated diene compound, may be composed entirely of the (hydrogenated) conjugated compound. Alternatively, it may be a copolymer block composed of at least 50 wt %, and preferably at least 70 wt %, of the (hydrogenated) conjugated diene compound, and containing also as a major component an aromatic vinyl compound.

Component (a-1) of the invention may have, in polymer block A composed primarily of an aromatic vinyl compound and in polymer block B composed primarily of a conjugated diene compound, a distribution along the molecular chain of conjugated diene compounds or aromatic vinyl compounds or units derived from aromatic vinyl compounds which is random, tapered (characterized by a gradual increase or decrease in the monomer components along the molecular chain), partially block-like, or any combination of the above.

If the block copolymer contains two or more each of the polymer block A composed primarily of an aromatic vinyl compound or the polymer block B composed primarily of a conjugated diene compound, the respective polymer blocks may have the same construction or different constructions.

The aromatic vinyl compound making up polymer block A may be one or more selected from among such compounds as styrene, α-methylstyrene, vinyltoluene and p-tert-butylstyrene. Of these, styrene is especially preferred.

The conjugated diene compound making up polymer block B may be one or more selected from among such compounds as butadiene, isoprene, 1,3-pentadiene and 2,3-dimethyl-1,3-butadiene. Of these, butadiene, isoprene, and combinations thereof are preferred.

The polymer block B composed primarily of a conjugated diene compound may be one having any selected microstructure, although it is recommended that the polybutadiene block B have a 1,2 unit content of at least 20 wt %, and preferably at least 25 wt %, but not more than 50 wt %, and preferably not more than 45 wt %.

For example, in a polyisoprene block, it is desirable for at least 70 wt %, and up to 100 wt %, of the isoprene to have a 1,4-microstructure. Moreover, it is advantageous for at least 70%, and preferably at least 90%, of the aliphatic double bonds originating from conjugated dienes, and especially isoprene or butadiene, to be hydrogenated.

Block copolymers serving as component (a-1) generally have a number-average molecular weight of at least 5,000, preferably at least 10,000, and most preferably at least 50,000, but not more than 1,500,000, preferably not more than 550,000, and most preferably not more than 400,000. The molecular weight distribution, or polydispersity index Mw/Mn, is generally not more than 10, preferably not more than 5, and most preferably not more than 2.

The block copolymer has a molecular structure which may be linear, branched, radial, or a combination of any of these. Specific examples of the (hydrogenated) block copolymer include SBS, SIS, SIBS, and hydrogenated products thereof.

Numerous methods exist for preparing such block copolymers. For example, advantageous use can be made of the process described in JP-B 40-23798 which involves block polymerization within an inert solvent using a lithium catalyst or Zeigler catalyst, and of a known method of hydrogenation.

Component (a-2):

Examples of the ethylene copolymer (rubber) and/or ethylene-α-olefin copolymer (rubber) serving as component (a-2) include ethylene-propylene copolymer rubber (EPR), ethylene-butene copolymer rubber (EBR), and terpolymers of ethylene, propylene and/or a non-conjugated diene (EPDM). These may be used alone or as combinations of two or more thereof.

"Ethylene-propylene copolymer rubber (EPR)" refers here to a rubbery copolymer of ethylene and propylene which has an ethylene content of preferably at least 40 wt %, more preferably at least 60 wt %, and most preferably at least 65 wt %, but not more than 80 wt %, and most preferably not more than 75 wt %. Too low an ethylene content may give the molded composition an inadequate abrasion resistance and a tendency toward tackiness, whereas too high an ethylene content may unacceptably lower the flexibility of the molded composition.

Additional examples of ethylene-propylene copolymer rubbers (EPR) that may be used as component (a-2) include ethylene-propylene terpolymers containing a non-conjugated diene as the third constituent (EPDM). Illustrative examples of the non-conjugated diene include 5-ethylidene-2-norbornene (ENB), 1,4-hexadiene, 5-methylene-2-norbornene (MNB), 5-vinylnorbornene (VNB), 1,6-octadiene, 5-methyl-1,4-hexadiene, 3,7-dimethyl-1,6-octadiene, 1,3-cyclopentadiene, 1,4-cyclohexadiene and/or dicyclopentadiene (DCPD).

"Ethylene-butene copolymer rubber (EBR)," as used herein, refers to a rubbery copolymer of ethylene and butene in which the ethylene content is preferably at least 40 wt %, and more preferably at least 60 wt %, but preferably not more than 85 wt %, and most preferably not more than 80 wt %. Too low an ethylene content may give the molded composition an inadequate abrasion resistance, whereas too high an ethylene content may unacceptably lower the flexibility of the molded composition.

It is advantageous for component (a-2) in the inventive composition to have a Mooney viscosity ($ML_{1+4}$, at 100° C.) of at least 5, and preferably at least 10, but not more than 120, and preferably not more than 100. Too low a Mooney viscosity may give the molded composition an inferior rubber elasticity, whereas too high a Mooney viscosity tends to result in a poor moldability.

Component (a-3):

The aromatic vinyl compounds and conjugated diene compounds used in component (a-3) may be the same as those mentioned above in connection with component (a-1). Accordingly, detailed descriptions of these are omitted below.

It is recommended that component (a-3) have an aromatic vinyl compound content of at least 5 wt %, but not more than 50 wt %, and preferably not more than 35 wt %. Too high a content hardens the feel of the molded cover and may prevent the objects of the invention from being achieved.

Conjugated diene compounds that may be used in component (a-3) include, as in the case of component (a-1), butadiene, isoprene, 2,3-dimethylbutadiene and pentadiene. It is particularly advantageous for at least 70%, and preferably at least 90%, of the aliphatic double bonds, based on the conjugated diene compound, to be hydrogenated.

It is recommended that component (a-3) of the invention be a random copolymer having a conjugated diene compound and aromatic vinyl compound content of not more than 50 wt %, a number-average molecular weight of at least 5,000 but not more than 1,000,000, and a polydispersity index (Mw/Mn) of not more than 10.

It is advantageous for this type of random copolymer to have a vinyl bond content (e.g., 1,2- or 3,4-bonds) in the conjugated diene segments of at least 5%, and preferably at least 20%, but not more than 90%. A vinyl bond content which is too low tends to harden the feel of the molded composition, which may prevent the objects of the invention from being achieved.

Aromatic vinyl compounds that may be used in component (c-3) include the same compounds as were mentioned above in connection with component (a-1). It is recommended that such aromatic vinyl compounds be randomly bonded, and that the block-type aromatic vinyl compound content, as determined according to the method of I. M. Kolthoff (*J. Polymer Sci.*, Vol. 1, p. 429 (1946)), be not more than 10 wt %, and preferably not more than 5 wt %, of all the aromatic vinyl compound bonded.

The above-described rubbery elastomer serving as component (a) may be used directly without modification in the inventive composition, although the use of a rubbery elastomer having polarity in the molecular structure is recommended. Polar groups included in the structure may be selected from among, for example, ester, carboxyl, carbonyl, acid anhydride, amino, hydroxy, glycidyl and oxazolyl groups. The use of a rubbery elastomer containing any of these polar groups is highly desirable because it markedly suppresses surface delamination of the molded cover and has a flexibility-imparting effect. Rubbery elastomers bearing acid anhydride, hydroxyl or glycidyl groups are especially preferred.

(b) Polar Group-Bearing Compounds:

It is recommended that the polar group-bearing compound (b) of the invention be a compound having one or more polar groups selected from among, for example, ester, carbonyl, carboxyl, acid anhydride, amino, hydroxyl, glycidyl and oxazolyl groups. Examples of such compounds include the following:

(b-1) unsaturated glycidyl compounds and/or derivatives thereof;
(b-2) unsaturated carboxylic acids and/or derivatives thereof;
(b-3) hydroxyl group-bearing (meth)acrylate compounds;
(b-4) liquid polybutadienes;
(b-5) ester compounds.

Components (b-1) to (b-5) are each described more fully below.

Component (b-1):

Unsaturated glycidyl compounds and/or derivatives thereof are used as modifying agents. The use of a glycidyl compound having on the molecule both an unsaturated group which is copolymerizable with olefin and a glycidyl group is preferred. Glycidyl methacrylate (GMA) is especially preferred.

Component (b-1) is capable of modifying the soft component of the (hydrogenated) block copolymer in above-described component (a), the peroxide-decomposable olefin resin of component (c) described subsequently, and/or copolymer rubbers containing the same. It can also further improve the compatibility between components A and B.

It is desirable to include component (b-1) in an amount of at least 0.01 part by weight, and preferably at least 0.1 part by weight, but not more than 20 parts by weight, and preferably not more than 10 parts by weight, per 100 parts by weight of component (a). Too much component (b-1) may not yield effects in keeping with the amount of addition and may lower the processability of the inventive composition, making it difficult to achieve a golf ball of good manufacturing precision. On the other hand, too little component (b-1) may fail to produce an observable improvement in the compatibility of components A and B.

Component (b-2):

Unsaturated carboxylic acids and derivatives thereof are used as modifying agents. Preferred examples include acrylic acid, methacrylic acid, maleic acid, dicarboxylic acids, and derivatives thereof, such as acids, halides, amides, imides, acid anhydrides and esters. The use of maleic anhydride (MAH) is especially preferred.

The addition of component (b-2) makes it possible to modify the soft component of the (hydrogenated) block copolymer in above-described component (a), the peroxide-decomposable olefin resin of component (c) described subsequently, and/or copolymer rubbers containing the same, such as polypropylene in particular.

It is desirable to include component (b-2) in an amount of at least 0.01 part by weight, preferably at least 0.1 part by weight, and most preferably at least 1 part by weight, but not more than 20 parts by weight, preferably not more than 15 parts by weight, and most preferably not more than 10 parts by weight, per 100 parts by weight of component (a). Too much component (b-2) may not yield effects in keeping with the amount of addition and may lower the processability of the inventive composition, making it difficult to achieve a golf ball of good manufacturing precision. On the other hand, too little component (b-1) may fail to produce an observable improvement in the compatibility of components A and B.

Component (b-3):

This is a hydroxyl group-bearing (meth)acrylate compound which improves the compatibility of components A and B. Illustrative examples include 2-hydroxyethyl acrylate, 2-hydroxyethyl methacrylate, 2-hydroxypropyl acrylate, 2-hydroxypropyl methacrylate, 3-chloro-2-hydroxypropyl methacrylate, 3-hydroxybutyl acrylate, ethyl-2-hydroxyethyl fumarate, 2-hydroxybutyl acrylate, 4-hydroxybutyl acrylate, polymers and copolymers of the above, and copolymers of the above with other monomers. Examples of copolymerizable monomers include ethylene, propylene, styrene, vinyl acetate and vinyl chloride. The use of 2-hydroxyethyl methacrylate is preferred.

It is desirable to include component (b-3) in an amount of at least 0.01 part by weight, preferably at least 0.1 part by weight, more preferably at least 1 part by weight, and most preferably at least 3 parts by weight, but not more than 50 parts by weight, preferably not more than 30 parts by weight, and most preferably not more than 20 parts by weight, per 100 parts by weight of component (a). Too much component (b-3) may result in the evolution of a large amount of gas during mixture and kneading, lower the workability of the composition, fail to yield effects in keeping with the amount of addition, and increase the cost of materials. On the other hand, too little component (b-1) may fail to produce an observable improvement in the compatibility of components A and B.

(b-4) Liquid Polybutadiene:

Liquid polybutadienes are polymers which are clear liquids at room temperature and in which the main chain has a microstructure composed of vinyl-1,2 vinyl bonds, trans-1,4 bonds and cis-1,4 bonds. The vinyl-1,2 bond content is preferably not more than 30 wt %. A liquid polybutadiene having too high a vinyl-1,2 bond content may compromise the low-temperature properties of the resulting composition.

The liquid polybutadiene has a number-average molecular weight of at least 1,000, and preferably at least 2,000, but not more than 5,000, and preferably not more than 4,000. A number-average molecular weight which is too low may lower the heat distortion resistance of the composition, whereas one that is too high may lower the compatibility of the resulting composition.

The liquid polybutadiene is preferably a copolymeric compound having one or more groups selected from among epoxy, hydroxyl, isocyanate, ester, carboxyl and carbonyl groups. Of these, the presence of hydroxyl and unsaturated double bonds is especially preferred. The use of a liquid polybutadiene such as the commercial product R-45HT™ made by Idemitsu Petrochemical Co., Ltd. is especially preferred.

It is desirable for the amount of component (b-4) included in the composition to be at least 1 part by weight, and preferably at least 3 parts by weight, but not more than 80 parts by weight, preferably not more than 50 parts by weight, and most preferably not more than 30 parts by weight. Too little component (b-4) may fail to demonstrate an addition effect, whereas too much may lower the mechanical properties of the composition.

(b-5) Ester Compound:

The (b-5) ester compound used in the invention is an ester-type plasticizer exemplified by such cyclic and acyclic plasticizers as phosphoric acid esters, phthalic acid esters, aliphatic monobasic acid esters, aliphatic dibasic acid esters, diol esters, oxyacid esters and acrylic polymers.

Examples of suitable cyclic plasticizers include phthalic anhydride esters and trimellitic acid esters, as well as N-cyclohexyl-p-toluenesulfonamide, dibenzyl sebacate, diethylene glycol dibenzoate, di-t-octyl phenyl ether, dipropanediol dibenzoate, N-ethyl-p-toluenesulfonamide, isopropylidene diphenoxypropanol, alkylated naphthalene, polyethylene glycol dibenzoate, o,p-toluenesulfonamide, trimethylpentanediol dibenzoate and trimethylpentanediol monoisobutyrate monobenzoate. Of these, phthalic anhydride esters and trimellitic acid esters are preferred.

Illustrative examples of phthalic anhydride esters include butyl octyl phthalate, butyl 2-ethylhexyl phthalate, butyl n-octyl phthalate, dibutyl phthalate, diethyl phthalate, diisodecyl phthalate, dimethyl phthalate, dioctyl phthalate, di(2-ethylhexyl) phthalate, diisooctyl phthalate, diisononyl phthalate (DINP), di-tridecyl phthalate, n-hexyl n-decyl phthalate, n-octyl n-decyl phthalate, alkyl benzyl phthalates, bis(4-methyl-1,2-pentyl) phthalate, butyl benzyl phthalate, butyl cyclohexyl phthalate, di(2-butoxyethyl) phthalate, cyclohexyl isodecyl phthalate, dicyclohexyl phthalate, diethyl isophthalate, di-n-heptyl phthalate, dihexyl phthalate, di(2-methoxyethyl) phthalate, dimethyl isophthalate, dinonyl phthalate, dioctyl phthalate, dicapryl phthalate, di(2-ethylhexyl) isophthalate, mixed dioctyl phthalates, diphenyl phthalate, 2-(ethylhexyl) isobutyl phthalate, butyl phthalylbutyl glycolate, ethyl (and methyl) phthalylethyl glycolate, polypropylene glycol bis(amyl) phthalate, hexyl isodecyl phthalate, isodecyl tridecyl phthalate and isooctyl isodecyl phthalate.

Illustrative examples of trimellitic acid esters include triisooctyl trimellitate, tri-n-octyl n-decyl trimellitate, trioctyl trimellitate, tri(2-ethylhexyl) trimellitate (TOTM), tri-n-hexyl n-decyl trimellitate, tri-n-hexyl trimellitate, triisodecyl trimellitate, and triisononyl trimellitate.

Illustrative examples of acyclic plasticizers include phosphoric acid esters, adipic acid esters, azelaic acid esters, citric acid esters, acetylcitric acid esters, myristic acid esters, ricinoleic acid esters, acetylricinoleic acid esters, sebacic acid esters, stearic acid esters and epoxidized esters. Additional examples include 1,4-butanediol dicaprylate, butoxyethyl pelargonate di[(butoxyethoxy)ethoxy] methane, dibutyl tartrate, diethylene glycol dipelargonate, diisooctyl diglycolate, isodecyl nonanoate, tetraethylene glycol di(2-ethyl butyrate), triethylene glycol di(2-ethyl hexanoate), triethylene glycol dipelargonate, the branched aliphatic diol ester compounds 2,2,4-trimethyl-1,3-pentanediol monoisobutyrate and 2,2,4-trimethyl-1,3-pentanediol diisobutyrate (TXIB), and acrylic polymers.

Illustrative examples of phosphoric acid esters include cresyldiphenyl phosphate, tricresyl phosphate, dibutylphenyl phosphate, diphenyloctyl phosphate, methyldiphenyl phosphate, tributyl phosphate, triphenyl phosphate, tri(2-butoxyethyl) phosphate, tri(2-chloroethyl) phosphate, tri(2-chloropropyl) phosphate and trioctyl phosphate.

Illustrative examples of adipic acid esters include di[2-(2-butoxyethoxy)ethyl] adipate, di(2-ethylhexyl) adipate, diisodecyl adipate, dioctyl adipate (including diisooctyl adipate), n-hexyl n-decyl adipate, n-octyl n-decyl adipate, and di-n-heptyl adipate.

Illustrative examples of sebacic acid esters include dibutyl sebacate, di(2-ethylhexyl) sebacate, dibutoxyethyl sebacate, diisooctyl sebacate and diisopropyl sebacate.

Illustrative examples of azelaic acid esters include di(2-ethylhexyl) azelate, dicyclohexyl azelate, diisobutyl azelate and diisooctyl azelate.

Examples of acrylic polymer plasticizers include polymers obtained by reacting a mixture of (i) a radical polymerizable monomer and (ii) a modifying compound in the presence or absence of a polymerization initiator. The polymer is preferably one in which the modifying compound (ii) is bonded to the polymer via an ester linkage. For example, it may be a polymer obtained by using (meth)acrylic acid as the radical polymerizable monomer (i) and using an aliphatic or alicyclic alcohol as the modifying compound (ii).

Illustrative examples of the radical polymerizable monomer (i) in the acrylic polymer plasticizer include (meth) acrylic acid; alkyl (meth)acrylates such as (methyl (meth) acrylate, ethyl (meth)acrylate, butyl (meth)acrylate and 2-ethylhexyl (meth)acrylate; hydroxyl group-bearing (meth) acrylates such as 2-hydroxyethyl (meth)acrylate and hydroxypropyl (meth)acrylate; maleic anhydride, maleic acid, and the mono- and dialkyl esters of maleic acid; aromatic vinyl monomers such as styrene and a-methylstyrene; vinyl esters such as vinyl acetate and vinyl propionate; alkenes such as ethylene and propylene; dienes such as butadiene and isoprene; and (meth)acrylonitrile, (meth)acrylamide, vinyl chloride, vinylidene chloride, allyl chloride and allyl alcohol.

Illustrative examples of the modifying compound (ii) include cycloalkanols such as cyclohexanol; alkanols such as isopropanol; halogenated alcohols such as fluoroalkyl alcohols; alkylenediols such as ethylene glycol and butane-diol; cycloalkylenediols such as cyclohexanediol and cyclohexyldimethanol; hydroxyl group-bearing modifiers which are polymers, such as polyethers or polyesters having terminal hydroxyl groups; carboxyl group-bearing compounds such as cyclohexylcarboxylic acids, cyclohexyldicarboxylic acids, adipic acid, sebacic acid, fluoroalkyldicarboxylic acids, maleic anhydride and fumaric acid; ester group-bearing modifiers such as ethyl acetate, butyl acetate, cellosolve acetate, methylpropylene glycol acetate, carbitol acetate and ethylcarbitol acetate; and alkenes such as cyclohexene, cyclopentene and isobutene.

One method that may be used for preparing an acrylic polymer in which above components (i) and (ii) are combined involves carrying out an esterification reaction between (i) (meth)acrylic acid, maleic anhydride, maleic acid or a monoalkyl ester of maleic acid and (ii) a hydroxyl group-bearing compound so as to form a polymer in which the modifying compound has been introduced. In another method, transesterification is carried out between (i) an ester-containing monomer such as methyl (meth)acrylate, ethyl acrylate, butyl acrylate or 2-ethylhexyl acrylate and (ii) a hydroxyl-bearing compound to form a functional polymer. Another method involves reacting (i) the hydroxyl-bearing monomer 2-hydroxyethyl (meth)acrylate or hydroxypropyl (meth)acrylate with (ii) a carboxyl-bearing or ester-bearing compound so as to form an ester linkage and thus obtain a polymer into which a functional group has been introduced. In yet another method, (i) a carboxyl group-bearing monomer such as (meth)acrylic acid and (ii) an alkene are used to effect the addition of a carboxyl group at an ethylenically unsaturated bond so as to form an ester linkage, thereby giving a polymer in which the modifying compound has been introduced.

Of the above-described acrylic polymer plasticizers which may be used in the invention, those in which component (i) is butyl acrylate, ethyl acrylate, hexyl acrylate, methoxyethyl acrylate or glycidyl acrylate are preferred. Acrylic polymer plasticizers in which component (i) is primarily ethyl acrylate are especially preferred.

It is recommended that the above-described acrylic polymer plasticizer have a weight-average molecular weight (Mw) of 500 to 10,000, preferably 1,000 to 6,000, and most preferably 1,000 to 3,000; a viscosity of 100 to 9,000 mPa·s, preferably 1,000 to 6,000 mPa·s, and most preferably 3,000 to 5,000 mPa·s; and a solubility parameter, as determined from the acetone-water tolerance, of 10.5 to 16.5, preferably 13 to 16, and most preferably 14 to 16.

Of the above plasticizers which are ester compounds, the use of DINP, TOTM or TXIB (made by Eastman Chemical Co.) is especially preferred. When an organic peroxide (d) is included in the inventive composition, component (b-5) graft polymerizes onto component (a) and primarily serves to enhance compatibility between components A and B.

It is desirable for the amount of component (b-5) included in the inventive composition per 100 parts of component (a) to be at least 0.1 part by weight, and preferably at least 5 parts by weight, but not more than 150 parts by weight, and preferably not more than 80 parts by weight. Too little component (b-5) may worsen the moldability of the resulting golf ball cover composition. On the other hand, too much component (b-5) results in a tendency for this component to bleed out from the golf ball cover composition, and may invite such undesirable effects in the molded cover as delamination, deformation and the appearance of flow marks. Moreover, gas evolution during processing may reach an unacceptable level.

Component (c):

Peroxide-decomposable olefinic resins and/or copolymer rubbers containing the same are able to improve the rubber dispersion of the resulting composition, improve the appearance of the molded cover, and confer hardness and shrinkage-adjusting effects. Component (c) is an olefinic polymer or copolymer which, when thermally decomposed by heat treatment in the presence of the organic peroxide described subsequently as component (d), undergoes a decline in molecular weight and an increase in melt flow rate. Illustrative examples include isotactic polypropylene, and copolymers of propylene with other α-olefins, such as ethylene, 1-butene, 1-hexene or 4-methyl-1-pentene.

Component (c) has a melt flow rate at 230° C., as measured in accordance with JIS K-7210 under a load of 2.16 kg, of preferably at least 0.1 g/10 min, and most preferably at least 0.5 g/10 min, but not more than 200 g/10 min, and most preferably not more than 100 g/10 min. Too small a melt flow rate lowers the moldability of the inventive composition, whereas too large a melt flow rate lowers the impact resilience of the molded composition, making it impossible to achieve the desired performance in a golf ball.

It is recommended that component (c) be included in the inventive composition in an amount per 100 parts by weight of component (a) of at least 1 part by weight, preferably at least 5 parts by weight, and most preferably at least 10 parts by weight, but not more than 200 parts by weight, preferably not more than 100 parts by weight, and most preferably not more than 50 parts by weight. Too little component (c) may worsen the moldability of the resulting composition, whereas too much may result in an excessive increase in the hardness of the molded composition, a loss of flexibility, and the inability to obtain a molded cover having a rubbery feel.

Component (d):

The organic peroxide serving as component (d) generates radicals which induce chain-like reactions and effect the crosslinking of component (a). At the same time, component (d) also induces component (b) to graft polymerize onto component (a), and enhances the compatibility of components A and B. Moreover, it decomposes or crosslinks optional components (c), (e), (g), (h) and (i) which are included in the composition if necessary, controlling the flow of the composition during melt blending and thus improving dispersion of the rubber components.

Illustrative examples of organic peroxides which may be used as component (d) in the inventive composition include dicumyl peroxide, di-tert-butyl peroxide, 2,5-dimethyl-2,5-di-(tert-butylperoxy)hexane, 2,5-dimethyl-2,5-di-(tert-butylperoxy)-3-hexane, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxy-benzoate, tert-butylperoxyisopropylcarbonate, diacetyl peroxide, lauroyl peroxide and tert-butylcumyl peroxide. Of these, 2,5-dimethyl-2,5-di(tert-butylperoxy)hexane and 2,5-dimethyl-2,5-di-(tert-butylperoxy)-3-hexane are especially preferred for minimizing offensive odors during production, minimizing discoloration, and providing good scorch safety.

It is recommended that the amount of component (d) included in the inventive composition per 100 parts by weight of component (a) be at least 0.01 part by weight, and preferably at least 0.1 part by weight, but not more than 3.5 parts by weight, and preferably not more than 3.0 parts by weight. Too much component (d) may worsen the moldability. On the other hand, too little may fail to achieve a sufficient degree of crosslinking, may fail to efficiently induce the reaction of component (b), and particularly components (b-1) to (b-5), and may lower the compatibility between components A and B.

Component (e):

Examples of suitable types of rubber softeners include non-aromatic mineral oils and liquid or low-molecular-weight synthetic softeners. Mineral oil-type rubber softeners are mixtures which contain a combination of aromatic rings, naphthene rings and paraffin chains. Generally, those mineral oil softeners in which the number of paraffin chain carbons accounts for at least 50% of the total number of carbons are referred to as paraffinic, those in which the number of naphthene ring carbons accounts for 30 to 40% of the total number of carbons are referred to as naphthenic, and those in which the number of aromatic ring carbons account for at least 30% of the total number of carbons are referred to as aromatic. It is desirable for the rubber softener serving as component (e) of the inventive composition to be a mineral oil-type rubber softener in particular. Paraffinic and naphthenic softeners are preferred; the use of an aromatic softener is undesirable because dispersion worsens on account of the relationship of this component with component (a).

Component (e) is preferably a paraffinic mineral oil softener, and most preferably one having a low aromatic content.

It is recommended that the non-aromatic rubber softener have a dynamic viscosity at 37.8° C. of 20 to 50,000 cSt, and preferably 20 to 500 cSt; a dynamic viscosity at 100° C. of 2 to 1,500 cSt, and preferably 2 to 50 cSt; a pour point of −25 to +15° C., preferably −25 to 0° C., and most preferably −25 to −10° C.; a flash point (COC) of 170 to 350° C.; and a weight-average molecular weight of 100 to 3,000, and preferably 100 to 2,000.

Component (e) may be included in the inventive composition in an amount, per 100 parts by weight of component (a), of at least 1 part by weight, preferably at least 5 parts by weight, and most preferably at least 10 parts by weight, but not more than 240 parts by weight, preferably not more than 200 parts by weight, and most preferably not more than 150 parts by weight. Too much component (e) tends to invite bleedout of the softener, may render the molded cover tacky, and may lower the mechanical properties. On the hand, the addition of component (e) in an amount below the above range, while still acceptable in practice, may lower the moldability of the composition and make it more difficult to obtain a golf ball manufactured to a high degree of precision.

In addition to above components (b) to (e), the rubbery elastomer composition C of the invention may include also, if necessary, any of the following components:
(f) ester co-crosslinking agents;
(g) polar resins;
(h) noncrystalline polyolefin components;
(i) peroxide-crosslinkable olefinic resins and/or copolymer rubbers containing the same.

These optional components are described below.

(f) Ester-Type Co-Crosslinking Agent:

If necessary, an ester-type co-crosslinking agent (f) may be advantageously included to carry out a uniform and efficient crosslinking reaction during crosslinking treatment using above-described organic peroxide as component (d).

Specific examples of component (f) include triallyl cyanurate; polyfunctional methacrylate compounds such as ethylene glycol dimethacrylate, diethylene glycol dimethacrylate, triethylene glycol dimethacrylate, tetraethylene glycol dimethacrylate, polyethylene glycol dimethacrylates having 9 to 14 ethylene glycol units, trimethylolpropane trimethacrylate, allyl methacrylate, 2-methyl-1,8-octanediol dimethacrylate and 1,9-nonanediol dimethacrylate; polyfunctional acrylate compounds such as polyethylene glycol diacrylate, 1,6-hexanediol diacrylate, neopentyl glycol diacrylate and propylene glycol diacrylate; and polyfunctional vinyl compounds such as vinyl butyrate and vinyl stearate. These ester-type co-crosslinking agents may be used alone or as combinations of two or more thereof. Of these co-crosslinking agents, the use of triethylene glycol dimethacrylate is especially preferred.

It is advantageous for the amount of the ester-type co-crosslinking agent (f) included in the inventive composition, per 100 parts by weight of the rubbery elastomer (a), to be at least 0.02 part by weight, and preferably at least 0.2 part by weight, but not more than 50 parts by weight, and preferably not more than 20 parts by weight. Use in an amount greater than the upper limit indicated above may lower the degree of crosslinking due to self-polymerizability, making it impossible to achieve the desired effect. On the other hand, use in an amount less than the lower limit indicated above may fail to fully achieve the anticipated effects of compounding component (f).

(g) Polar Resin:

If necessary, the golf ball cover composition of the invention may include also, aside from the above components, a polar resin (g) containing one or more polar groups selected from among ester, carboxyl, carbonyl, acid anhydride, amino, hydroxyl, glycidyl and oxazolyl groups. Illustrative examples of such polar resins include saponified ethylene-vinyl acetate copolymers (saponified EVA), maleic anhydride-modified polyethylene, maleic anhydride-modified polypropylene, and ethylene-glycidyl methacrylate copolymers. If a polar resin (g) is included in the inventive composition, it is recommended that the amount be at least 0.1 part by weight, but not more than 100 parts by weight, and preferably not more than 50 parts by weight, per 100 parts by weight of component (a).

(h) Noncrystalline Polyolefin Component:

If necessary, the golf ball cover composition of the invention may include also a noncrystalline polyolefin component (h). The noncrystalline polyolefin component (h) used in the present invention is a noncrystalline copolymer composed primarily of propylene, which copolymer has a melt viscosity at 190° C. of 250 to 50,000 mPa·s, and preferably 10,000 to 25,000 mPa·s. The use of a relatively low molecular weight polymer having a degree of crystallization, as measured by x-ray diffraction analysis, of not more than 50%, and preferably not more than 20%, is desirable. Preferably, the noncrystalline polyolefin has a glass transition temperature of −33 to −23° C., and a softening point of 120 to 135° C.

Specific examples of suitable noncrystalline polyolefins include atactic polypropylene, which is a noncrystalline homopolymer, and noncrystalline copolymers of primarily propylene with other olefins (e.g., ethylene, 1-butene, 1-pentene, 1-hexene, 4-methyl-1-pentene, 1-octene, 1-decene). Of these noncrystalline polyolefins, the use of an atactic polypropylene, a propylene/ethylene noncrystalline copolymer, or a propylene/1-butene noncrystalline copolymer is preferred. The noncrystalline polyolefin may be a random copolymer or a block copolymer. If it is a block copolymer, the propylene units must be bonded so as to form an atactic structure. If the noncrystalline copolymer is a copolymer of propylene and ethylene, it is desirable that the content of propylene units be at least 50 mol %, and preferably at least 60 mol %, but not more than 100 mol %.

If component (h) is included in the inventive composition, it is recommended that the amount be at least 1 part by weight, and preferably at least 3 parts by weight, but not more than 150 parts by weight, and preferably not more than 80 parts by weight, per 100 parts by weight of component (a). In cases where a softener (e) is also included, too much component (h) may lead to bleedout of the softener (e) from the resulting golf ball cover composition, and may make the molded product subject to delamination, deformation and the appearance of flow marks.

(i) Peroxide-Crosslinkable Olefinic Resin and/or Copolymer Rubber Containing the Same:

The peroxide crosslinkable olefinic resin and/or copolymer rubber containing the same is preferably one or more selected from among such polyethylenes as high-density polyethylenes (low-pressure polyethylene), low-density polyethylenes (high-pressure polyethylene) and linear low-density polyethylenes (copolymers of ethylene with a small amount, and preferably 1 to 10 mol %, of an α-olefin such as 1-butene, 1-hexene or 1-octene); ethylene-propylene copolymers, ethylene-vinyl acetate copolymers and ethylene-acrylate copolymers. Ethylene-octene copolymers and ethylene-hexene copolymers prepared using a metallocene catalyst (single-site catalyst) are especially preferred.

Illustrative examples include olefinic polymers prepared according to the process described in JP-A 61-296008, in which polymerization is effected using an olefin polymer catalyst composed of a carrier and the reaction product of a metallocene containing at least one metal from group 4b, 5b or 6b of the periodic table with alumoxane, which reaction product is formed in the presence of the carrier.

It is desirable for component (i) to have a melt flow rate at 190° C., as measured in accordance with JIS K-7210 under a load of 2.16 kg, of 0.1 to 100 g/10 min, and preferably 0.3 to 50 g/10 min.

The amount of component (i) included in the inventive composition is preferably at least 5 parts by weight, but not more than 100 parts by weight, and especially not more than 50 parts by weight, per 100 parts by weight of component (a). An amount greater than the upper limit may compromise the flexibility of the resulting golf ball cover composition and, in cases where a rubber softener is included as component (g), may facilitate the bleedout of component (g).

Preparation of Rubbery Elastomer Composition C:

The rubbery elastomer composition C of the invention may be prepared by simultaneously or sequentially adding components (b) to (i), as needed, to component (a), and melt blending the components.

Any commonly known melt blending method may be used without particular limitation. For example, use may be made of a single screw extruder, a twin screw extruder, a roll mill, a Banbury mixer or any of various types of kneaders. The above operation can be carried out using, for instance, a twin-screw extruder having a suitable L/D ratio, a Banbury mixer, or a pressure kneader. The melt blending temperature is preferably 160 to 220° C.

As described above, the golf ball cover composition of the invention contains as essential components (a) an ionomer resin, (b) a urethane material, and (C) a rubbery elastomer composition. Other components which the inventive composition may also contain if necessary include a polyurethane polymer and/or copolymer thereof, a polyester polymer and/or copolymer thereof, a polyamide polymer and/or copolymer thereof, various antiblocking agents, seal enhancers, heat stabilizers, antioxidants, ultraviolet light absorbers, lubricants, nucleating agents, colorants, inorganic fillers and blowing agents (organic and inorganic). If necessary, other components such as dyes, pigments (titanium dioxide, zinc oxide, barium sulfate) and light stabilizers may also be added in conventional amounts.

Examples of suitable antioxidants include phenolic antioxidants such as 2,6-di-tert-p-butyl-p-cresol, 2,6-di-tert-butylphenol, 2,4-dimethyl-6-tert-butylphenol, 4,4-dihydroxydiphenyl and tris(2-methyl-4-hydroxy-5-tert-butylphenyl)butane, as well as phosphite antioxidants and thioether antioxidants. The use of a phenolic antioxidant or a phosphite antioxidant is especially preferred.

In addition to the above ingredients, dispersing agents such as polyethylene waxes, metal soaps, fatty acid esters and fatty acid amides may be added. The purpose for including such dispersing agents in the inventive composition is not to influence the performance of the ball, but rather to enhance the moldability of the composition. For example, if a polyethylene wax is used, it is recommended that this be included in an amount, based on the overall golf ball cover composition, of at least 0.2 wt %, preferably at least 0.5 wt %, and most preferably at least 0.6 wt %, but not more than 10.0 wt %, preferably not more than 5.0 wt %, and most preferably not more than 1.5 wt %.

The golf ball cover composition of the invention is prepared by compounding both an ionomer resin (A) and a urethane material (B). The ionomer resin A is included in an amount of generally at least 1 part by weight, preferably at least 5 parts by weight, more preferably at least 10 parts by weight, even more preferably at least 20 parts by weight, and most preferably at least 25 parts by weight, but generally not more than 99 parts by weight, preferably not more than 95 parts by weight, more preferably not more than 90 parts by weight, even more preferably not more than 80 parts by weight, and most preferably not more than 75 parts by weight. The urethane material B is included in an amount of generally at least 1 part by weight, preferably at least 5 parts by weight, more preferably at least 10 parts by weight, even more preferably at least 20 parts by weight, and most preferably at least 25 parts by weight, but generally not more than 99 parts by weight, preferably not more than 95 parts by weight, more preferably not more than 90 parts by weight, even more preferably not more than 80 parts by weight, and most preferably not more than 75 parts by weight. In addition, the inventive composition also includes a rubbery elastomer (a)-containing rubbery elastomer composition C in an amount, per 100 parts by weight of the combined amount of ionomer resin A and urethane material B compounded in the foregoing proportions, of generally at least 1 part by weight, preferably at least 3 parts by weight, and most preferably at least 5 parts by weight, but generally not more than 50 parts by weight, preferably not more than 25 parts by weight, more preferably not more than 20 parts by weight, and most preferably not more than 10 parts by weight. Compounding amounts outside of the above ranges may have such undesirable effects as a decline in resilience, phase separation owing to poor compatibility, and a lower durability of the molded cover to repeated impact, thus preventing sufficient improvement effects as a golf ball cover composition from being achieved.

The mixing method used during the mixing operation is not subject to any particular limitation. For example, use may be made of a roll mill, internal mixer, single screw extruder or twin screw extruder, depending on the mixing ratio of the ionomer resin A, urethane material B and rubbery elastomer composition C serving as the essential components. In such cases, preferred use can be made of a method in which first the urethane material is dissolved in any of various solvents, following which it is mixed with a base resin. Preparation of the composition can be achieved by mixing under applied heat at 150 to 270° C.

The golf ball cover composition of the invention is highly suitable for use in the formation of relatively thin covers. In such a case, it is recommended that the melt viscosity be set to a low level; that is, to a melt flow rate at 190° C., as measured according to JIS K-7210 under a load of 2.16 kg, of generally at least 1 g/10 min, but not more than 10 g/10 min.

The golf ball composition of the invention may be prepared by a known method and cured, although it is critical that the composition have a Shore D hardness when cured of at least 45, preferably at least 48, and most preferably at least 52, but not more than 63, and preferably not more than 61. A Shore D hardness which is too low worsens the durability of the molded cover to repeated impact, whereas one that is too high compromises the feel of the ball upon impact and its durability.

The golf ball according to the invention has a cover formed from the golf ball cover composition of the invention, and can be manufactured by a method known to the art. More specifically, the ball may be a solid two-piece golf ball having a one-piece core, a solid three-piece golf ball having a two-piece core and a cover, or a solid multi-piece golf ball having a core composed of three or more pieces and a cover. The cover formed of the inventive composition may be composed of both an outermost layer and a sublayer.

The core of the inventive golf ball is not subject to any particular limitation, and may be a thread-wound core or a solid core. However, because formation of the cover by an injection molding process provides excellent moldability and is highly conducive to mass-production, the use of a solid core is preferred.

The solid core is preferably formed using a rubber composition composed primarily of cis-1,4-polybutadiene. Production of the core can otherwise be carried out by a conventional method using known materials.

The diameter, weight, hardness and other characteristics of the core may be set to any desired values without particular limitation, although it is generally advantageous for the diameter to be at least 34.67 mm, and preferably at least 36.67 mm, but not more than 40.90 mm, and preferably not more than 40.50 mm; for the weight to be at least 21.4 g, and preferably at least 26.0 g, but not more than 40.5 g, and preferably not more than 39.45 g; and for the hardness, expressed as the deformation when subjected to a load of 100 kg, to be at least 2.0 mm, and preferably at least 2.4 mm, but not more than 4.2 mm, and preferably not more than 3.8 mm.

Given that the golf ball of the invention has a cover formed of the inventive golf ball cover composition over the above-described solid core, as already noted, advantageous use can be made of an injection molding method. For example, as in prior-art ionomer resin covers, the golf ball cover composition may be injection molded directly over the core. Alternatively, use may be made of a method in which first a pair of hemispherical cups is molded from the inventive golf ball cover composition, then the cups are placed over the core and molded under heat (140 to 180° C.) and pressure for 2 to 10 minutes.

The golf ball thus obtained has dimples on the surface, although the method of forming the dimples is not subject to any particular limitation. Once the ball has been formed, finishing treatment such as buffing, stamping and painting may be carried out on the surface thereof.

The thickness, specific gravity and other characteristics of the cover formed from the inventive golf ball cover composition may be set to any desired values without particular limitation, although it is generally advantageous for the cover thickness to be at least 0.2 mm, and preferably at least 0.5 mm, but not more than 4.0 mm, and preferably not more than 3.0 mm; and for the specific gravity to be at least 0.94, and preferably at least 0.96, but not more than 1.35, and preferably not more than 1.30.

It is advantageous for the golf ball of the invention to have a hardness, expressed as the deformation when subjected to a load of 100 kg, of at least 2.2 mm, and preferably at least 2.4 mm, but not more than 4.0 mm, preferably not more than 3.5 mm, and most preferably not more than 3.1 mm.

The golf ball of the invention can be manufactured such as to have a diameter and weight which conform with the Rules of Golf. That is, the ball may be given a diameter of at least 42.67 mm and a weight of not more than 45.93 g.

The golf ball cover composition of the invention has a good moldability and can provide golf ball covers having excellent resilience, durability and feel upon impact. The golf balls of the invention have a cover formed of the above golf ball cover composition, are endowed with excellent rebound characteristics, durability and feel upon impact, and are able to provide an increased distance.

EXAMPLES

Examples of the invention and comparative examples are given below by way of illustration, and are not intended to limit the invention. In the examples and comparative examples described below, the core formulations shown in Table 1 were blended, then molded and vulcanized in a mold at 155° C. and for 20 minutes to form three types of solid cores A to C.

The diameter, specific gravity and hardness of the resulting solid cores were measured. The results are shown in Table 1. The amounts of each of the ingredients shown in Table 1 are in parts by weight.

TABLE 1

|  |  | Type of core | | |
|---|---|---|---|---|
|  |  | A | B | C |
| Core formulation (pbw) | Polybutadiene rubber [1] | 100.0 | 100.0 | 100.0 |
|  | Zinc acrylate | 27.0 | 26.5 | 26 |
|  | Zinc oxide | 15.4 | 21.0 | 24.8 |
|  | Dicumyl peroxide | 1.0 | 1.0 | 1.0 |
| Core properties | Specific gravity | 1.14 | 1.17 | 1.19 |
|  | Diameter (mm) | 38.5 | 38.5 | 38.5 |
|  | Weight (g) | 33.8 | 34.5 | 35.3 |
|  | Hardness (mm)[2] | 3.4 | 3.4 | 3.4 |

[1] Made by Japan Synthetic Rubber Co., Ltd. under the trade name BR01.
[2] Deformation (mm) when subjected to a load of 100 kg.

Compatibilizing agents (rubbery elastomer compositions) A to C were prepared to the respective compositions shown in Table 2 below.

TABLE 2

| Formulation (pbw) | Compatibilizing agent A | Compatibilizing agent B | Compatibilizing agent C |
|---|---|---|---|
| (1) SEPS | 100 | 100 | 100 |
| (2) PP | 20 | 0 | 10 |
| (3) Oil | 12.5 | 0 | 10 |
| (4) Liquid polybutadiene | 12.5 | 15 | 15 |
| (5) GMA | 3.75 | 0 | 0 |
| (6) MAH | 5 | 0 | 0 |
| (7) Organic peroxide | 2.8 | 0.8 | 1.25 |
| (8) HEMA | 0 | 6.25 | 6.25 |
| Total | 156.55 | 122.05 | 142.5 |

(1) SEPS: Septon 4077, made by Kuraray Co., Ltd.
Styrene content: 30 wt %
Number-average molecular weight (Mn): 260,000
Weight-average molecular weight (Mw): 320,000
Mw/Mn: 1.23
Percent hydrogenated: >90%
(2) PP: CH-700, made by Grand Polymer Co., Ltd.
Density: 0.9 g/cm$^3$
(3) Oil: Diana Process Oil PW-90 ™, made by Idemitsu Kosan Co., Ltd.
(4) Liquid Polybutadiene: R-45HT ™, made by Idemitsu Kosan Co., Ltd.
Contains as functional groups both hydroxyl groups (acrylic primary groups) and copolymerizable unsaturated double bonds (1,4 bonds, 80%).
Number-average molecular weight: 2800
(5) GMA: Glycidyl methacrylate made by Kanto Chemical Co., Inc.
(6) MAH: Maleic anhydride made by Kanto Chemical Co., Inc.
(7) Organic peroxide: Perhexa 25B (2,5-dimethyl-2,5-di(t-butylperoxy) hexane, made by NOF Corporation
(8) HEMA: 2-Hydroxyethyl methacrylate (HEMA), made by Kanto Chemical Co., Inc.

The formulations shown in Table 3 were blended in a twin-screw extruder to form the respective cover compositions, and the resulting compositions were subsequently injection molded as golf ball covers over the solid cores A to C, thereby giving solid two-piece golf balls according to Examples 1 to 8 and Comparative Examples 1 to 6. In each case, the cover stock was prepared by compounding 3 parts by weight of titanium white per 100 parts by weight of the ionomer resin A and the urethane material B combined.

Each of the resulting golf balls was measured or evaluated as described below for various properties. The results are shown in Table 3.

Golf Ball Hardness:

Measured as the deformation (mm) when the ball was subjected to a load of 100 kg. A large value indicates a softer ball.

Initial Speed:

Measured in accordance with the method of the United States Golf Association (USGA) and The Royal and Ancient Golf Club of St. Andrews (R&A).

Moldability:

(a) Molding stability: The stability during injection molding of the ball was visually rated according to the following criteria.

| Good: | Moldable without any particular problems |
|---|---|
| Fair: | Flow inadequate, resulting in somewhat of a decline in sphericity |
| Poor: | Flow inadequate and unstable, resulting in eccentricity and large variations in sphericity |

(b) Fuzz: Rated in terms of the surface roughness of the ball after surface has been buffed. The compatibility of components A and B was evaluated in terms of fuzz caused by the buffing operation following golf ball formation.

| Good: | No rough areas on ball surface |
|---|---|
| Poor: | Ball surface has rough areas |

Flight Performance:

The spin rate, carry and total distance were measured when the ball was struck at a head speed of 45 m/s with a driver (number one wood) mounted on a swing robot machine.

Feel When Hit With a Driver:

The feel of the ball when actually shot with a driver (number one wood) was rated by five professional or top-caliber amateur golfers. The rating assigned most often to a particular ball was used as that ball's rating.

| Good: | Very good |
|---|---|
| Fair: | Ordinary |
| Poor: | Poor (too hard or too soft) |

Durability When Repeatedly Hit:

The tendency of a ball to crack when repeatedly struck at a head speed of 38 m/s was rated as follows.

| | |
|---|---|
| Excellent: | Ball did not crack after being struck at least 300 times |
| Good: | Ball cracked after being struck 200 to 299 times |
| Fair: | Ball cracked after being struck 150 to 199 times |
| Poor: | Ball cracked after being struck 149 times or less |

Trade names mentioned in Tables 3 and 4 are described in the notes appearing after the tables. The cover hardness values were obtained by measuring the surface hardness of a separately fabricated resin sheet using a Shore D durometer.

TABLE 3

| | Formulation | Example 1 | 2 | 3 | 4 | 5 | 6 | 7 | 8 |
|---|---|---|---|---|---|---|---|---|---|
| Ionomer resin | S6320[3] | | | | | | 40 | | |
| | H1605[4] | 40 | 45 | 47.5 | 40 | 40 | 40 | 10 | 25 |
| | H1706[5] | 40 | 45 | 47.5 | 40 | 40 | | 10 | 25 |
| Urethane material | TR3080[6] | 20 | 10 | 5 | | | | | |
| | T7298[7] | | | | 20 | 20 | | 80 | |
| | T-8190[8] | | | | | | 20 | | 50 |
| Compatibilizing agent (rubbery elastic composition) | Compatibilizing agent A | 10 | 5 | 3 | | | 10 | 10 | 10 |
| | Compatibilizing agent B | | | | 10 | | | | |
| | Compatibilizing agent C | | | | | 10 | | | |
| Type of core | | B | B | C | B | B | B | A | A |
| Cover | Shore D hardness | 54 | 58 | 61 | 58 | 58 | 56 | 54 | 52 |
| Ball properties | Diameter (mm) | 42.69 | 42.71 | 42.68 | 42.7 | 42.69 | 42.71 | 42.67 | 42.71 |
| | Weight (g) | 45.2 | 45.06 | 45.30 | 45.1 | 45.2 | 45.21 | 45.50 | 45.02 |
| | Hardness (mm) | 3.0 | 2.8 | 2.6 | 2.4 | 2.7 | 2.9 | 3.0 | 3.1 |
| | Initial velocity (m/s) | 76.7 | 77.2 | 77.4 | 77.2 | 77.1 | 77.0 | 76.8 | 76.6 |
| Moldability | Molding stability | good | good | good | good | good | good | good | good |
| | Scuffing | good | good | good | good | good | good | good | good |
| Feel when hit with driver | | good | good | good | good | good | good | good | good |
| Repeated impact durability | Number of impacts | ≧300 | ≧300 | ≧300 | ≧300 | ≧300 | ≧300 | ≧300 | ≧300 |
| | Rating | excellent | excellent | excellent | excellent | excellent | excellent | excellent | excellent |
| Flight performance | Spin rate (rpm) | 3250 | 3200 | 3100 | 3200 | 3200 | 3200 | 3350 | 3350 |
| | Carry (m) | 212.5 | 213.0 | 214.5 | 213.5 | 213.5 | 213.0 | 213.0 | 212.0 |
| | Total distance (m) | 224.0 | 226.0 | 227.0 | 225.0 | 225.0 | 224.0 | 223.5 | 223.0 |

TABLE 4

| | Formulation | Comparative Example 1 | 2 | 3 | 4 | 5 | 6 |
|---|---|---|---|---|---|---|---|
| Ionomer resin | S6320[3] | | 50 | | | 40 | |
| | H1605[4] | 50 | 50 | 40 | 40 | 40 | 25 |
| | H1706[5] | 50 | | 40 | 40 | | 25 |
| Urethane material | TR3080[6] | | | 20 | | | |
| | T7298[7] | | | | 20 | | |
| | T-8190[8] | | | | | 20 | 50 |
| Compatibilizing agent (rubbery elastic composition) | Compatibilizing agent A | | | | | | |
| | Compatibilizing agent B | | | | | | |
| | Compatibilizing agent C | | | | | | |
| Type of core | | C | C | B | B | B | A |
| Cover | Shore D hardness | 65 | 54 | 55 | 59 | 52 | 52 |
| Ball properties | Diameter (mm) | 42.69 | 42.71 | 42.73 | 42.7 | 42.7 | 42.68 |
| | Weight (g) | 45.1 | 45.04 | 45.2 | 45.2 | 45.15 | 45.05 |
| | Hardness (mm) | 2.5 | 3.1 | 3.0 | 2.8 | 3.3 | 3.3 |
| | Initial velocity (m/s) | 77.5 | 76.4 | 76.5 | 76.9 | 76.2 | 75.9 |

TABLE 4-continued

| | Formulation | Comparative Example | | | | | |
| --- | --- | --- | --- | --- | --- | --- | --- |
| | | 1 | 2 | 3 | 4 | 5 | 6 |
| Moldability | Molding stability | good | fair | poor | poor | poor | poor |
| | Scuffing | good | good | poor | poor | poor | poor |
| Feel when hit with driver | | poor | good | good | good | good | good |
| Repeated impact durability | Number of impacts | 170 | ≧300 | 180 | 120 | 170 | 150 |
| | Rating | fair | excellent | fair | poor | fair | fair |
| Flight performance | Spin rate (rpm) | 2900 | 3300 | 3250 | 3200 | 3400 | 3400 |
| | Carry (m) | 215.0 | 210.5 | 211.0 | 211.5 | 209.5 | 208.0 |
| | Total distance (m) | 227.0 | 220.0 | 222.5 | 222.0 | 219.5 | 218.0 |

[3] An ethylene-methacrylic acid-methacrylate terpolymer ionomer produced by E.I. DuPont de Nemours and Co. Ion type, magnesium. Surface hardness (Shore D), 42.
[4] An ethylene-methacrylic acid copolymer ionomer produced by Dupont-Mitsui Polychemicals Co., Ltd. Ion type, sodium. Surface hardness (Shore D), 63.
[5] An ethylene-methacrylic acid copolymer ionomer produced by Dupont-Mitsui Polychemicals Co., Ltd. Ion type, zinc. Surface hardness (Shore D), 62.
[6] An aliphatic isocyanate/polyester polyol non-yellowing type thermoplastic polyurethane elastomer made by DIC Bayer Polymer, Ltd. Surface hardness (Shore D), 41. Impact resilience, 60%.
[7] An aliphatic isocyanate/polyester polyol non-yellowing type thermoplastic polyurethane elastomer made by DIC Bayer Polymer, Ltd. Surface hardness (Shore D), 51. Impact resilience, 57%.
[8] A diphenylmethane diisocyanate/polyester polyol standard type thermoplastic polyurethane elastomer. Surface hardness (Shore D), 40. Impact resilience, 48%.

Japanese Patent Application No. 2001-137221 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball cover composition comprising:

(A) an ionomer resin, (B) a thermoplastic urethane material, and (C) a rubbery elastomer composition containing (a) a rubbery elastomer;

which golf ball cover composition, when molded, has a Shore D hardness of 45 to 63, wherein the rubbery elastomer (a) has at least one polar group selected from the group consisting of ester, carboxyl, carbonyl, acid anhydride, amino, hydroxyl, glycidyl and oxazolyl groups.

2. A golf ball cover composition comprising:

(A) an ionomer resin, (B) a thermoplastic urethane material, and (C) a rubbery elastomer composition containing (a) a rubbery elastomer;

which golf ball cover composition, when molded, has a Shore D hardness of 45 to 63 and includes 100 parts by weight of ionomer resin (A) and thermoplastic urethane material (B) combined, and 1 to 50 parts by weight of the rubbery elastomer (a)-containing rubbery elastomer composition (C).

3. A golf ball comprising a cover made of a golf ball cover composition comprising:

(A) an ionomer resin, (B) a thermoplastic urethane material, and (C) a rubbery elastomer composition containing (a) a rubbery elastomer and at least one substance selected from the group consisting of:

(b) polar group-bearing compounds, (c) peroxide-decomposable olefinic resins or copolymer rubbers containing the same or both, (d) organic peroxides, and (e) rubber softeners;

which golf ball cover composition, when molded, has a Shore D hardness of 45 to 63.

* * * * *